Feb. 24, 1970     A. J. GARBIN     3,496,783
POWER TRANSMISSION BELTING AND METHOD OF MAKING SAME
Filed May 25, 1967     3 Sheets-Sheet 1

INVENTOR
ALBERT J. GARBIN
BY
*Staehli + Ourman*
ATTORNEYS

Feb. 24, 1970          A. J. GARBIN          3,496,783
POWER TRANSMISSION BELTING AND METHOD OF MAKING SAME
Filed May 25, 1967                         3 Sheets-Sheet 2

INVENTOR
ALBERT J. GARBIN
BY
ATTORNEYS

Feb. 24, 1970 A. J. GARBIN 3,496,783
POWER TRANSMISSION BELTING AND METHOD OF MAKING SAME
Filed May 25, 1967 3 Sheets-Sheet 3

INVENTOR
ALBERT J. GARBIN
BY
ATTORNEYS

United States Patent Office 3,496,783
Patented Feb. 24, 1970

3,496,783
POWER TRANSMISSION BELTING AND
METHOD OF MAKING SAME
Albert J. Garbin, Cumberland, R.I., assignor to Owens-Corning Fiberglas Corporation, a corporation of Delaware
Filed May 25, 1967, Ser. No. 641,222
Int. Cl. F16g 5/16
U.S. Cl. 74—233
7 Claims

ABSTRACT OF THE DISCLOSURE

An annular rubber V-belt construction featuring an interiorly disposed linear glass reinforcement member extending longitudinally and spirally thereof; the reinforcement being composed of a twisted together plurality of yarns; the yarns being composed of a twisted together plurality of strands; the strands being composed of a plurality of individual filaments of glass and the twist present in the yarns and strands being opposite. Preferably, the yarn assembly features ½, 2½ or 3½ twists per inch.

The present invention relates to industrial drive belts and to methods of manufacturing same. More particularly, the present invention relates to a novel reinforcement in the form of an interiorly disposed tensioning element within the drive belt.

Drive belts are employed in industry for transmitting rotary motion from a source, usually a motor or other source of power, to an auxiliary unit. A common example resides in the automobile engine wherein a V-belt transmits rotation from the driveshaft to the generator and water pump. Drive belts viewed in section are of trapezoidal configuration, as in the case of V-belts, or are definitive of a thin rectangle, as in the case of a flat belt. This type of industrial belting desirably includes a reinforcement in order that the belt will not become overly elongated under the continuous exposure to rotation under load conditions. Unreinforced rubber will eventually elongate due to its inherent stretch and flexibility. A variety of textile materials have in the past been employed as reinforcement for industrial belts. Included among these materials are cotton, rayon, nylon, polyester and glass fibers. The reinforcement may take the form of an interwoven fabric or a spiral cord wrap. The conventional textile materials, such as cotton, nylon and rayon, exhibit elongation under extended service conditions and, additionally, are found to ultimately fail under extended load conditions. This shortcoming is to be expected of the organics, of course, since inherently they will yield under stress, exhibit permanent set and, as well, changes in dimension due to certain thermal or other atmospheric effects. Glass, on the other hand, has essentially 100% elasticity, exhibits practically no yield under stress and possesses excellent dimensional stability plus immunity to changes due to atmospheric conditions.

It must be recognized, however, that fiber glass possesses a number of inherent properties or characteristics which are substantially different as compared to those possessed by the organic textile fibers conventionally used as a reinforcement for rubber. By way of example, the stiffness of glass is 322 grams per denier (g.p.d.); while the stiffness of nylon ranges from 18 to 23 g.p.d., the stiffness of polyester fibers (Dacron and Kodel) ranges from 11 to 21 g.p.d., the stiffness of acrilan fibers (Orlon) amounts to about 10 g.p.d., while the stiffness of viscose rayon amounts to about 0.2 g.p.d. Similarly, the breaking elongation of a glass fiber is about 3–4%; while the breaking elongation of (a) polyester fibers ranges from 19–30%, (b) nylon fibers ranges from 25–40%, (c) acrilan is 25%, and (d) viscose rayon is 15–30%. By way of further example, glass fibers have a specific gravity of 2.54, whereas nylon and acrilan is about 1.14, rayon is about 1.46, and polyesters (Dacron and Kodel) are 1.22 and 1.38, respectively. In toughness on a denier basis, glass with a value of 0.07 is considerably lower than nylon's value of 0.75, rayon's value of 0.19, polyester's value of 0.5 for Dacron and 0.37 for Kodel and acrilan's value for Orlon of 0.4.

From the preceding data, it can be seen that, with respect to a number of properties, fiber glass differs from the more conventional organic fibers by a factor of from 3 to 10 or more. Accordingly, any consideration of adopting fiber glass as a reinforcement for rubber, of necessity, must proceed with the realization that mere substitution of a glass fiber for organic fibers is not feasible. To the contrary, new and unique fiber glass, strand, yarn or cord configurations must be developed to accommodate the difference in properties. Also, for glass to be used as a reinforcement, new geometric relationships as between the glass and the rubber, e.g., novel spatial dispositions, must be developed, having in mind, of course, in all cases, the stresses to which the ultimate product is to be subjected.

With the foregoing introduction, it is an object of the present invention to provide an industrial drive belt featuring a particular configuration of glass reinforcement elements as to provide longer life under extended service conditions.

It is additionally an object of the present invention to provide an industrial drive belt construction including a novel array of glass reinforcement elements arranged in a particular configuration.

It is still another object of the present invention to provide an industrial drive belt which is capable of being manufactured according to conventional practice in the industry.

It is likewise an object of the present invention to provide a method of manufacturing industrial power transmission belting employing novel glass reinforcing elements in the nature of composite assemblies of glass filament sub-assemblies of unique construction.

It is still another object of the present invention to provide such a method which is adapted for incorporation into conventional and known drive belt manufacturing techniques and processes.

The above-enumerated objects as well as others will become apparent to those skilled in the art from the following detailed description taken in conjunction with the annexed sheets of drawings on which there is presented, for purposes of illustration only, several embodiments of the constructional features of the present invention and the methods of manufacturing the belt construction of the present invention.

For purposes of simplicity and clarity, the present invention will be described herein and in the accompanying drawings in connection with light duty fractional horsepower belting, frequently referred to in the trade as V-belts.

Figure 7:
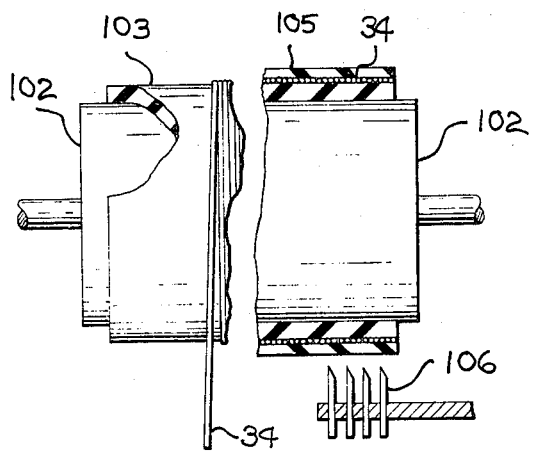
Figure 8:
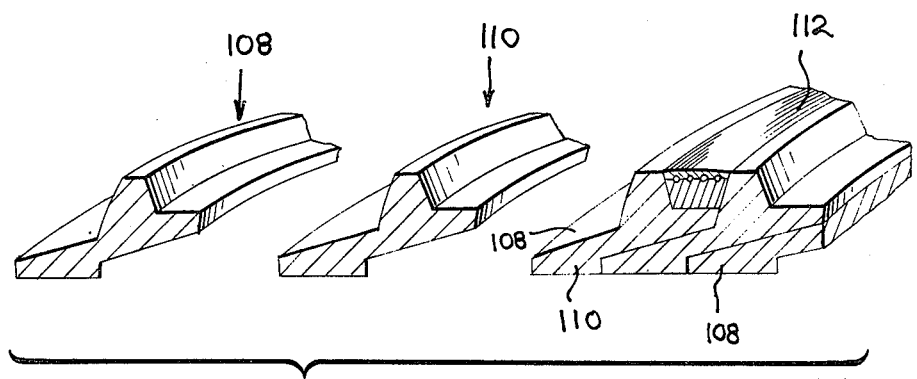

FIG. 7 is a vertical sectional view of an apparatus illustrating one step in the manufacture of light duty fractional horsepower belting incorporating a reinforcement element in accordance with the present invention; and FIG. 8 is a three-quarter perspective view schematically illustrating a step in the manufacture of V-belts incorporating a novel reinforcement element in accordance with the present invention.

Viewed most basically, the present invention envisions an annular or endless belt construction including an interiorally disposed glass reinforcement member proceeding in spiral fashion longitudinally thereof; said reinforcement member comprising a plurality of sub-assemblies of glass elements; the sub-assemblies being formed of sub-units; the sub-units and sub-assemblies being sequentially twisted together in opposite directions. More specifically, it has been determined that a glass cord, formed of a plurality of yarns twisted together in one direction a given number of turns, the yarns in turn being formed of a plurality of strands being formed of a large plurality of substantially continuous glass filaments, when incorporated into an industrial drive belt imparts thereto remarkably improved endurance under load conditions. That is, the belt so reinforced exhibits a much longer life before failure.

Figure 1:
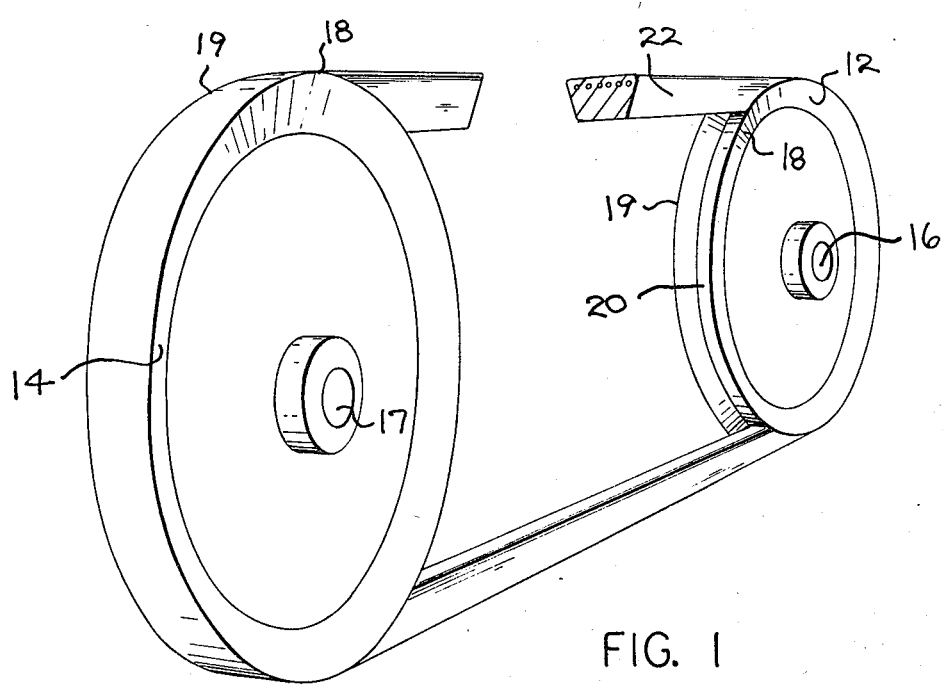
FIG. 1 is a partial perspective view of a V-belt in an industrial application mounted rotatingly on a pair of sheaves.

The nature of the novel constructional features will become apparent from a closer examination of the drawings as follows:

In FIG. 1, there is disclosed a pair of spaced sheaves or pulleys 12 and 14 having axis of rotation 16 and 17 which are in parallel spaced relationship. The pulleys each include peripheral flanges 18 and 19 which define therebetween a recess 20 for a V-belt 22. The V-belt 22 is annular in configuration and therefore essentially endless, in other words. The belt serves to transmit rotation from the pulley 12 driven by an electric motor, not shown, to a pulley 14 which is connected via its axis 17 to a unit desired to be rotated.

Figure 5:
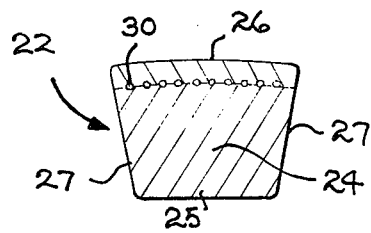
FIG. 5 is a vertical sectional view, greatly enlarged, of the V-belt illustrated in FIG. 1 and incorporating a continuous reinforcement glass element in accordance with the present invention.

The V-belt 22 is shown somewhat enlarged in FIG. 5 and, as can be seen, is composed of an elastomeric rubber-like matrix 24 which is generally in the form of a trapezoid having a minor base 25, a major base 26 in parallel relationship and downwardly inclined side walls 27. Interiorally of the matrix 24 is a cord reinforcement 30 which proceeds in spiral fashion longitudinally of the belt; the successive wraps lying in side-by-side relationship, as shown, and spaced generally uniformly from the major base and closer to the major base 26.

Figure 3:
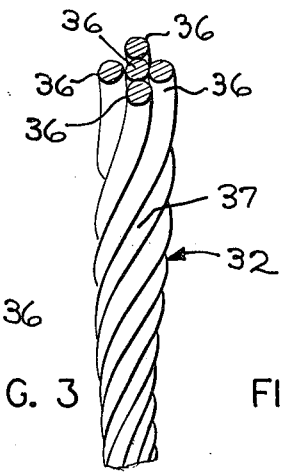
FIG. 3 is a schematic perspective view of a plurality of the elements of FIG. 2 in an intermediate stage of assembly.
Figure 4:
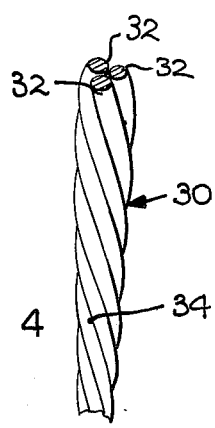
FIG. 4 is likewise a schematic perspective view showing a plurality of the elements of FIG. 3 in an intermediate stage of assembly in the manner of forming a reinforcement element in accordance with the present invention.

The cord 30, which constitutes the reinforcement for the industrial drive belt in accordance with the present invention, is formed of a particular array and assembly of glass-sub-elements. The primary cord 30 is shown greatly enlarged in FIG. 4. Thus, the cord 30 is formed of three sub-elements referred to as yarns, identified by the reference numeral 32. These sub-elements or yarns are twisted together to form the cord 30 in such a way that the central portion of the spiral defined by the twisting of the yarns 32 conforms in slope to the central portion of the letter S. This central portion is identified in the drawings by the reference numeral 34. One of the yarn sub-assemblies 32 is shown greatly enlarged in FIG. 3. It is in turn composed of five strands 36 which are twisted together as illustrated and, more particularly, such that the spiral formed by the twisting of the strands defines a central portion thereof which conforms in slope to the central portion of the letter Z. This central portion of the spiral is identified by the reference numeral 37. The strand element 36 is shown in turn greatly enlarged in FIG. 2 and, as can be seen, is composed of a large plurality of individual glass fibers or filaments 40 held together by a binder.

Figure 2:
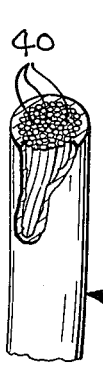
FIG. 2 is a schematic perspective view of a glass sub-element of utility in the formation of a reinforcement for the drive belt construction of the present invention.

The individual fibers or filaments 40 are drawn from an electrically heated platinum bushing through a plurality of orifices in the bottom wall thereof. The number of orifices generally is a multiple of the numeral 102. Thus, the bushing may have 204 filaments in its bottom wall or even 408 filaments and higher. These are drawn simultaneously in a manner well known in the art and combined with or without twists on a winding drum, usually preceded by the application of a "size." The "size" is usually applied by a mist or spray application thereof. The "size," for example, starch, provides a degree of protection for the individual fibers and, as well, may incorporate the function of a binder holding the plurality of filaments more securely in a compact strand formation, as shown in FIG. 2. Most preferably, the "size" is selected to achieve protection, binding and also a compatibility with the subsequent impregnation and ultimate incorporation into the rubber-like matrix of the V-belt. Formulation of "sizes" adapted to accomplish the desired result are given later herein.

The twisting combination of five strands into yarn formulation and the twisting assembly of three yarns into a cord assembly is accomplished with readily available commercially produced twister apparatus. One such apparatus known as a "Haskell-Dawes Twister" is disclosed somewhat diagrammatically in FIG. 6. As shown in the drawings, three freely rotatable spools 50, 51 and 52 serve as a supply reservoir for continuous lengths of 5-strand yarn assemblies 32 which are simultaneously drawn about a roller 53, through an aligning comb 54, over roller 55, under roller 56 and through a plate 57 containing three spaced orifices. The three yarns then pass into the twister apparatus 60 mounted on a standard 62. An upstanding frame 63 supports a rotatable hub 64 having arm extremities 65 and 66 extending oppositely. The arms 65 and 66 each bear normally projecting fingers 68 and 69. Finger 69 is a weight counterbalance for the finger 68. A pair of spools 72 and 74 are attached to the hub 64 and the one-arm extension 65. A support bracket 75 extends normally from the hub 64 and bears at its extremity a roller 76. Finger 68 bears rollers 84 and 86 at its end extremities, as shown. The hub 64 is rotated by geared wheels 77 and 78; the latter being connected to an electric motor 79 controlled by a rheostat 80 for controlling the rate of revolution of the hub 64 and the fingers 68 and 69. The three strands passing from the orificed plate 57 pass horizontally through a central passageway 82 in the hub about roller 76 and then in turn are entrained repeatedly about rollers 72 and 74 from which the three yarns emerge to pass over rollers 84 and 86 mounted rotatably on finger 68. The 3-yarn assembly is then wound upon flanged spool 88 which is mounted for reciprocal to and fro movement in the direction indicated by the arrows 89. The rotation of the hub causes the finger element 68 (counterbalanced by finger 69) to rotate about the axis of the hub 100 which causes the 3-yarn assembly to become simultaneously twisted together and wrapped about the core of the spool 88, as shown. The rotation of the hub and the finger 68 about the spool 88 causes the three yarns to be twisted into a cord assembly. The number of twists is controlled by the rotation of the hub. The foregoing twisting operation forms no part of the present invention, but the description is included in the interest of a full disclosure of the method of producing the novel glass cord reinforcement construction in accordance with the present invention. The reference numeral 30 identifies the side-by-side cords (which have been formed in the twisting operation) residing on the core of the spool 88.

The incorporation of the novel cord construction in accordance with the present invention is schematically illustrated in FIG. 7 which discloses an elongated, rotatable mandrel 102 cut away centrally in order to show, on the left, the wrapping of the cord reinforcement in V-belt manufacture and, on the right, the green V-belt sub-assembly. The drum 102 is first provided with a layer of a vulcanizable rubber stock 103 wrapped about the mandrel so that it extends from edge to edge and defines a fairly uniform thickness. The stock is usually applied as a sheet of fairly precise dimensions and overlapping chamfered edges are stitched together with a knurled tool. Then the glass cord 34 of the particular construction of the present invention is wound spirally as the mandrel is rotated in the manner indicated in this FIG. 7. For clarity of illustration, the successive winds of cord are shown spaced apart. In practice, they are located fairly close together. The winding continues from one lateral edge to the other. The cord is an endless length extending from one edge to the other and, when this is completed, the cord is cut. Then a second somewhat thinner layer 105 of vulcanizable stock is applied coextensive with the layer 103 and over the spiral array of side-by-side cord wraps or winds. A plurality of knives 106 of the appropriate spacing are directed against the layered assembly, shown in the right-hand portion of FIG. 7, to cut the multi-layered assembly into a plurality of annular belt-like members. In certain cases, the knives are inclined toward each other to more closely approximate the trapezoidally shaped V-belt configuration. In some cases, only one knife is emloyed and it is repeatedly inserted through a slotted bar to provide uniform spacing of the cut edges. The mandrel upon which the rubber stock and cord is wrapped is collapsible in order that the final cut belt can be removed for insertion in the ring mold. The cut piece is then ready for molding in a ring mold such as shown in FIG. 8 in a partial schematic view. The ring molds 108 and 110 are shown spaced apart and also in mating engagement in FIG. 8. The ring molds 108 and 110, when engaged, define a cavity into which the cut piece 112 is located. A plurality of ring molds are employed in order that a plurality of V-belts can be cured or vulcanized at the same time. When the vulcanizable belt assemblies are located in the cavities and the ring molds secured together, the entire assembly is wrapped with a nylon sheeting a plurality of times to create in effect an outer restraining wall confining the rubber during the curing, which is conducted in an autoclave maintained at an appropriate temperature for the curing system and rubber stock employed.

As indicated earlier herein, the present invention resides in the discovery that markedly increased belt life is achieved with a reinforcement comprising a particular combination of sub-elements of glass incorporating a preferred amount of twisting thereof and, in addition, a preferred combination of direction of twists of the several sub-assemblies. Most ideally, the ultimate cord to be incorporated into a V-belt is composed of a plurality of three yarns twisted together in a direction such that the central portion defined by the twist yields a spiral; the slope of which conforms in slope to the central portion of the latter S. Additionally, each yarn element is most desirably formed of five individual strands twisted together with opposite twist; namely, in a manner that the central portion of the spiral defined by the twisted strands conforms in slope to the central portion of the letter Z. Insofar as we are able to determine, the individual filaments of fibers making up the strands may incorporate no twist or a slight twist (either S or Z) up to about 5 without influencing the life expectancy of the belt. Most desirably, the number of turns employed in assembling the yarns into the ultimate S-twist cord should be a number which constitutes a fraction having the numeral 2 as a denominator and an uneven whole integer between 1 and 5, inclusive, as the numerator. The optimum in belt endurance is achieved when the 3-yarn cord assembly incorporated in the belt is twisted together to define an S-twist and the number of turns is controlled to yield 2½ twists per linear inch of cord. Good results are also achieved when the yarns are twistingly assembled together to define a cord having 1½ S-twists per inch. On the other hand, poorer results are achieved when the belt features a reinforcement cord in which the number of twists per inch is either 2 twists per inch or 3 twists per inch. The foregoing advantages will become more apparent from the examples and tabulated data to follow hereinafter.

The following table contains a formulation of a suitable "size" composition desirably sprayed as a mist or spray upon the fibers as they are drawn from the forming bushing in attenuated form and just prior to the gathering together of the individual filaments into assembled strand formation. The "size" upon application is allowed to dry in ambient air.

TABLE 1

0.5–2.0 percent by weight gamma-aminopropyltriethoxy silane
0.3–0.6 percent by weight glycerine
Remainder water The foregoing "size" formulation is desirably controlled to have a solids content within the range of 0.25–3.0% by weight and, most preferably, 0.5–1.0% by weight, having in mind the intent of incorporating a dry coating weight in the range of 0.5–1.0% by weight on the glass fibers.

The multi-strand yarn embodying preferably a Z-twist is desirably passed through an impregnating bath before the yarns are combined with reverse twist into the ultimate cord assembly. The following is a formulation of a suitable impregnating bath composition.

TABLE 2

40–80 percent by weight Lotol 5440—U.S. Rubber Company. Lotol 5440 is a 38% dispersed solids system including a butadiene-styrene-vinyl pyridine terpolymer latex, a butadiene styrene latex and a resorcinol-formaldehyde resin
60–20 percent by weight of water Impregnation of the foregoing yarn assembly is achieved by passing the yarn assembly through the liquid bath. A higher degree of impregnation or penetration into the interstitial voids is improved by subjecting the yarn to some distortion while within the bath proper. This can be accomplished by passing the continuously moving yarn to a change in direction as about a post, mandrel or pulley maintained in submersed relationship within the bath. The impregnated yarn is then desirably passed through a wiping die to remove excess impregnant and subjected to a temperature of 150° F.–350° F. to remove the diluent and "set" the solid firmly in the interstitial voids.

It will be appreciated that the selection of impregnant will be governed by the nature of the rubber stock material in which the impregnated "cord" or "bundle" is to be embedded in the several methods disclosed herein. Generally, it is desired that the impregnated yarn be composed of from 75–95% glass and 5–25% impregnant.

There will now be described a complete sequence of operations illustrating, in the nature of an example, the practice of the present invention.

Figure 6:
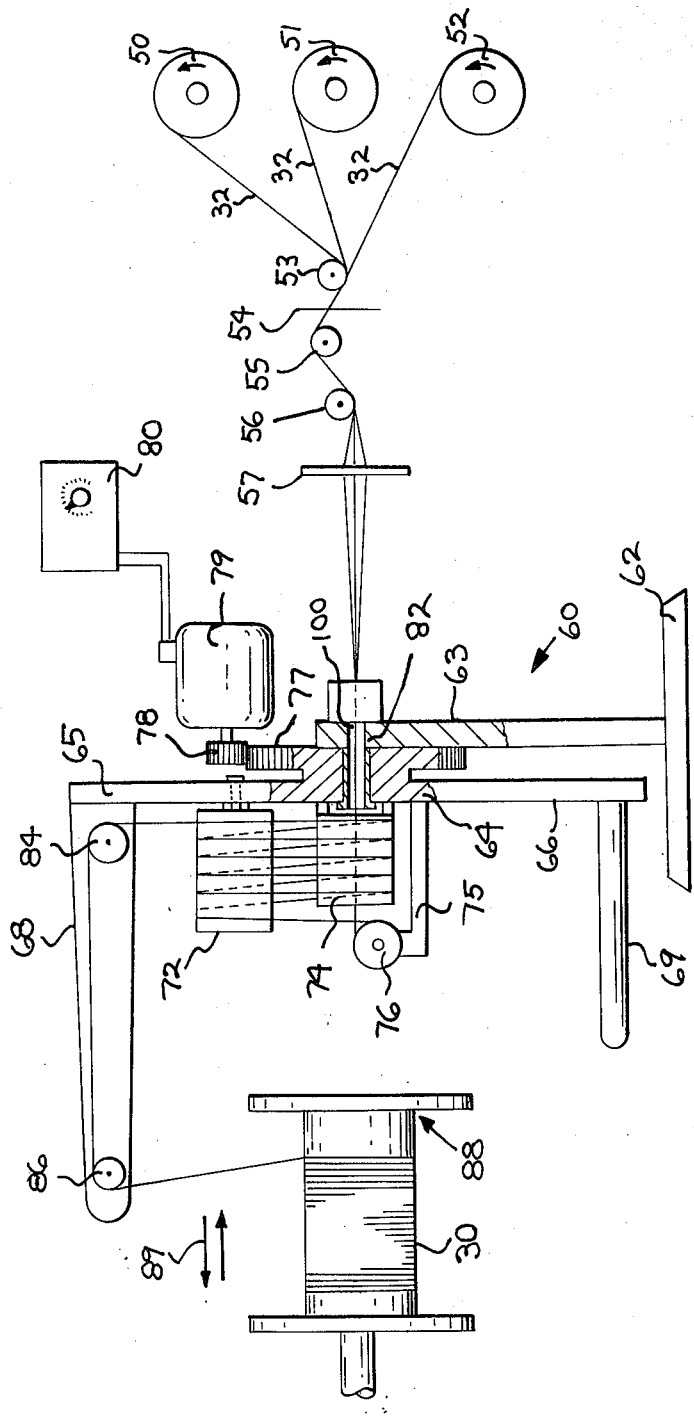
FIG. 6 is a side elevation view, partially in section and partially diagrammatic, illustrating one manner of processing glass sub-elements to produce a final assembly as well as an intermediate assembly of glass elements in order to form a glass reinforcement in accordance with the present invention.

Example I (a) A supply of alkali-metal-free glass is melted in a bushing provided with 408 orifices in the bottom wall. Continuous filaments of the glass measuring 0.00038 inch in diameter were drawn simultaneously from the bushing through a spray of "size" in accordance with the formulation of Table 1 above and wound into a strand in conventional fashion. Five strands as described were drawn from separate spools and combined on a Haskell-Dawes Twister apparatus, as shown in FIG. 6, into a Z-twist yarn featuring three twists per lineal inch of yarn. The twisted yarns as described were gathered on a receiving spool and subsequently unreeled and passed into an impregnant bath having a composition in accordance with Table 2 and thereafter dried at 200° F. (oven temperature 350° F.). Three of the impregnated yarns, each contained on a supply spool, were combined again in a Haskell-Dawes Twister apparatus, as illustrated in FIG. 6, to form a 3-yarn cord assembly of the type illustrated in FIG. 4. The twisting operation was controlled to yield a 3-yarn cord featuring 1.2 S-twists per inch. The cord, as just described, was utilized in the manufacture of a plurality of V-belts according to the procedure described earlier herein employing a stock having the composition identified just hereinbelow in Table 3; which formulation may be identified as a combination SBR/natural rubber blend.

TABLE 3

| | Parts |
|---|---|
| #1 Ribbed smoked sheet—Preboken | 30 |
| SBR 1500 | 70 |
| Zinc oxide | 3 |
| AgeRite resin D | 3 |
| Santocure | 2 |
| SRF black | 100 |
| Sulfur | 2 |
| Stearic acid | 1 |
| Circo oil—light | 5 |
| ½" chopped cotton fibers | 6 |
| | 222 |

Tensile, 1935
Elongation, 190%
Modulus @ 50%, 770
Modulus @ 100%, 1095
Durometer, 85

(b) The procedure described in paragraph (a) was repeated, excepting that the final assembly of yarns forming the ultimate cord was combined employing 1.5 S-twists per inch.

(c) The procedure described in paragraph (a) was repeated, excepting that the final assembly of yarns forming the ultimate cord was combined employing 2 S-twists per inch.

(d) The procedure described in paragraph (a) was repeated, excepting that the final assembly of yarns forming the ultimate cord was combined employing 2.5 S-twists per inch.

(e) The procedure described in paragraph (a) was repeated, excepting that the final assembly of yarns forming the ultimate cord was combined employing 2.9 S-twists per inch.

The belts identified by code number 4L400 have the following dimensions. The belt circumference is 40 inches. The belt viewed in section has a major base measuring 0.531 inch, a minor base measuring 0.327 inch and a height of 0.281 inch. The cord spacing in the belt measures 21 ends per inch in each case. The foregoing belts were then tested to failure on a conventional endurance test setup which involves running the belts over two 2½ inch outside diameter sheaves having 0.485 inch top width with a 30° angular pitch and a 0.490 inch groove depth. The drive sheave was rotated at 3600 r.p.m. on an electric motor and the load on the driven sheave was controlled at 90 lbs. The belt temperature, center to center distance and other conditions were noted and recorded at 24-hour intervals and the belts were run until failure occurred. Table 4 below summarizes the test results. In Table 4, column 1 identifies the belt with reference to the foregoing sub-paragraphs, followed by the S-twists per inch features in this particular belt. Column 2 identifies the total hours to failure.

TABLE 4

| Belt | S-Twists per inch | Hours to failure |
|---|---|---|
| (a) | 1.2 | 208 |
| (b) | 1.5 | 253 |
| (c) | 2.0 | 229 |
| (d) | 2.5 | 286 |
| (e) | 2.9 | 205 |

Belt (b), as can be seen, ran 45 hours (21.6%) longer than belt (a) and 21 hours (15%) longer than belt (c). Belt (d), representing 2½ S-twists per inch, endured 78 hours (37.5%) longer than belt (a) and 57 hours (25%) longer than belt (c).

Example II

A similar series of belts were fabricated of the same glass cord as identified but the rubber matrix composition was as follows in Table 5.

TABLE 5

| | Parts |
|---|---|
| #1 ribbed smoked sheet | 40 |
| SBR 1500 | 60 |
| Zinc oxide | 5 |
| Stearic acid | 2 |
| AgeRite resin D | 1 |
| Thermoflex A | 1.5 |
| Altax | 1.5 |
| Ledate | 0.2 |
| Circosol 2XH | 10 |
| SRF black | 75 |
| FEF black | 20 |
| HAF black | 20 |
| Sulfur | 2 |
| | 238.2 |

In this Example II, the series of belts featured constructions as follows. Belts were fabricated employing a cord featuring 1.5 S-twists per inch, a cord featuring 2 S-twists per inch and a cord featuring 2.5 S-twists per inch. The test results on the life of the belt run to failure on the same test setup as described in Example I are summarized in Table 6; wherein, in column 1, the belt is characterized by the number of S-twists per inch employed in the glass cord assembly used as the reinforcing member.

TABLE 6

| Belt | S-Twists per inch | Hours to failure |
|---|---|---|
| (f) | 1.5 | 329 |
| (g) | 2.0 | 262 |
| (h) | 2.5 | 367 |

Belt (f) featuring 1.5 S-twists per inch cord reinforcement and belt (h) featuring 2.5 S-twists per inch glass cord reinforcement endured, respectively, 67 hours (25.6%) and 105 hours (40%) longer than belt (g) which incorporated a cord featuring 2.0 S-twists per inch.

Example III

To further check the performance demonstrated by the foregoing tests results, a supply of glass cord of 1.5 S-twists per inch construction, a supply of cord featuring 2.0 S-twists per inch construction, a supply of cord featuring 2.5 S-twists per inch construction and a supply of cord featuring 2.9 S-twists per inch construction was furnished an independent manufacturer of V-belts who constructed a plurality of V-belts featuring the supplied cord. The cords incorporated 5-strand yarns impregnated with a composition as set forth in Table 2. The vulcanized belts were then tested as before with the results noted in Table 7.

TABLE 7

| Belt | S-Twists per inch | Hours to Failure |
|---|---|---|
| (i) | 1.5 | 241 |
| (j) | 2.0 | 195 |
| (k) | 2.5 | 354 |
| (l) | 2.9 | 196 |

As can be seen, belt (i) featuring 1.5 S-twists per inch lasted about 46 hours (23.6%) longer than belts (j) or (l) featuring either 2.0 or 2.9 S-twists per inch. Even more striking, belt (k) featuring 2.5 S-twists per inch demonstrated a life endurance of 159 hours (84.4%) longer than either of the belts featuring 2.0 or 2.9 S-twists per inch.

Exactly why the belts featuring cord constructions of 1.5 and 2.5 S-twists per inch in the assembly of the yarn elements resulted in improved life or endurance under load conditions is not known.

From the foregoing, it can be seen that there has been disclosed a novel reinforcement in the nature of a tensioning member for industrial drive belts. In particular, the novel cord arrangement of the present invention involving reverse twists of the several sub-assemblies and particularly a particular relationship of the number of turns, twists and the direction of twists provides a marked increase in the life of the belt under load conditions.

Modifications may be resorted to without departing from the spirit and scope of the present invention.

I claim:

1. In an annular belt comprising a rubber-like matrix and an inner reinforcing cord, said cord extending continuously within said matrix in an annular path spaced from the inner and outer periphery of said matrix, said cord comprising a plurality of assembled parns twisted together in the form of a spiral, said yarns each comprising a plurality of assembled strands twisted together, said strands each including a plurality of substantially continuous, substantially inextensible filament elements assembled together; the improvement wherein (1) the twist exhibited by the combined assembly of yarns is opposite to the twist exhibited by the combined assembly of strands, (2) the central portion of the spiral defined by the twisted together yarns conforms in slope to the central portion of the letter S and (3) the number of S-twists per inch is a fraction having 2 as a denominator and an uneven whole integer ranging from 1 to 5, inclusive, as a numerator.

2. An annular belt as claimed in claim 1, wherein the number of yarns is three (3).

3. An annular belt as claimed in claim 2, wherein the number of strands is five (5).

4. An annular belt as claimed in claim 1, wherein the surface of the individual filaments have a size material thereon.

5. An annular belt as claimed in claim 4, wherein each of said strands includes an elastomeric impregnant interiorly thereof.

6. In an annular belt comprising a rubber-like matrix and an inner reinforcing cord, said cord extending continuously within said matrix in an annular path spaced from the inner and outer periphery of said matrix, said cord comprising a plurality of assembled yarns twisted together in the form of a spiral, said yarns each comprising a plurality of assembled strands twisted together, said strands each including a plurality of substantially continuous, substantially inextensible filament elements assembled together; the improvement wherein (1) the twist exhibited by the combined assembly of yarns is opposite to the twist exhibited by the combined assembly of strands, (2) the central portion of the spiral defined by the twisted together yarns conforms in slope to the central portion of the letter S and (3) the S-twist measures about two and one-half (2½) twists per inch.

7. An annular belt as claimed in claim 6, wherein the twist of the assembly of strands, being opposite to that of the assembly of yarns, generally conforms in slope to the letter Z, and said Z-twist measures about three (3) twists per inch.

References Cited

UNITED STATES PATENTS

| 1,632,201 | 6/1927 | Steere. | |
| 1,689,119 | 10/1928 | Evans. | |
| 2,273,200 | 2/1942 | Hoff | 74—231 XR |
| 2,631,463 | 3/1953 | Waugh | 74—233 |
| 2,792,319 | 5/1957 | Fihe | 74—233 |

FRED C. MATTERN, Jr., Primary Examiner

J. A. WONG, Assistant Examiner